(12) United States Patent
Shibayama

(10) Patent No.: US 7,299,149 B2
(45) Date of Patent: Nov. 20, 2007

(54) PORTABLE DEVICE WITH ACTION SHORTCUT FUNCTION

(75) Inventor: Hiroaki Shibayama, Shizuoka (JP)

(73) Assignee: NEC Corporation, Tokyo (JP)

( * ) Notice: Subject to any disclaimer, the term of this patent is extended or adjusted under 35 U.S.C. 154(b) by 12 days.

(21) Appl. No.: 11/093,234

(22) Filed: Mar. 30, 2005

(65) Prior Publication Data

US 2005/0234676 A1 Oct. 20, 2005

(30) Foreign Application Priority Data

Mar. 31, 2004 (JP) ............................. 2004-102728

(51) Int. Cl.
*G06F 15/00* (2006.01)
(52) U.S. Cl. ...................... 702/150; 455/557; 701/209; 702/141
(58) Field of Classification Search ................ 702/141, 702/188, 189; 340/853.2, 825.49; 463/31, 463/43; 700/245; 701/207, 209, 214; 345/115, 345/440, 426; 455/557
See application file for complete search history.

(56) References Cited

U.S. PATENT DOCUMENTS 6,314,368 B1* 11/2001 Gurmu et al. .............. 701/209
6,941,239 B2* 9/2005 Unuma et al. .............. 702/141
6,957,088 B2 10/2005 Kato et al.
2005/0054381 A1* 3/2005 Lee et al. .................... 455/557

FOREIGN PATENT DOCUMENTS

| CN | 1379871 A | 11/2002 |
|---|---|---|
| JP | 9-081308 | 3/1997 |
| JP | 2000-78262 A | 3/2000 |
| JP | 2001-033253 A | 2/2001 |
| JP | 2002-149616 A | 5/2002 |
| JP | 2003-005879 A | 1/2003 |
| JP | 2003-114752 A | 4/2003 |
| JP | 2003-131796 A | 5/2003 |
| JP | 2003-256129 A | 9/2003 |
| WO | WO 01/27735 A1 | 4/2001 |

* cited by examiner

*Primary Examiner*—John Barlow
*Assistant Examiner*—John Le
(74) *Attorney, Agent, or Firm*—Foley & Lardner LLP

(57) ABSTRACT

A portable information device has an action recognizing function. An action detector precisely detects a single 3-dimensional movement of the device. A plurality of reference action patterns each linked to predetermined functions are registered in an action shortcut table. An action comparator compares the input action with the registered reference action patterns to activate a corresponding function.

9 Claims, 6 Drawing Sheets

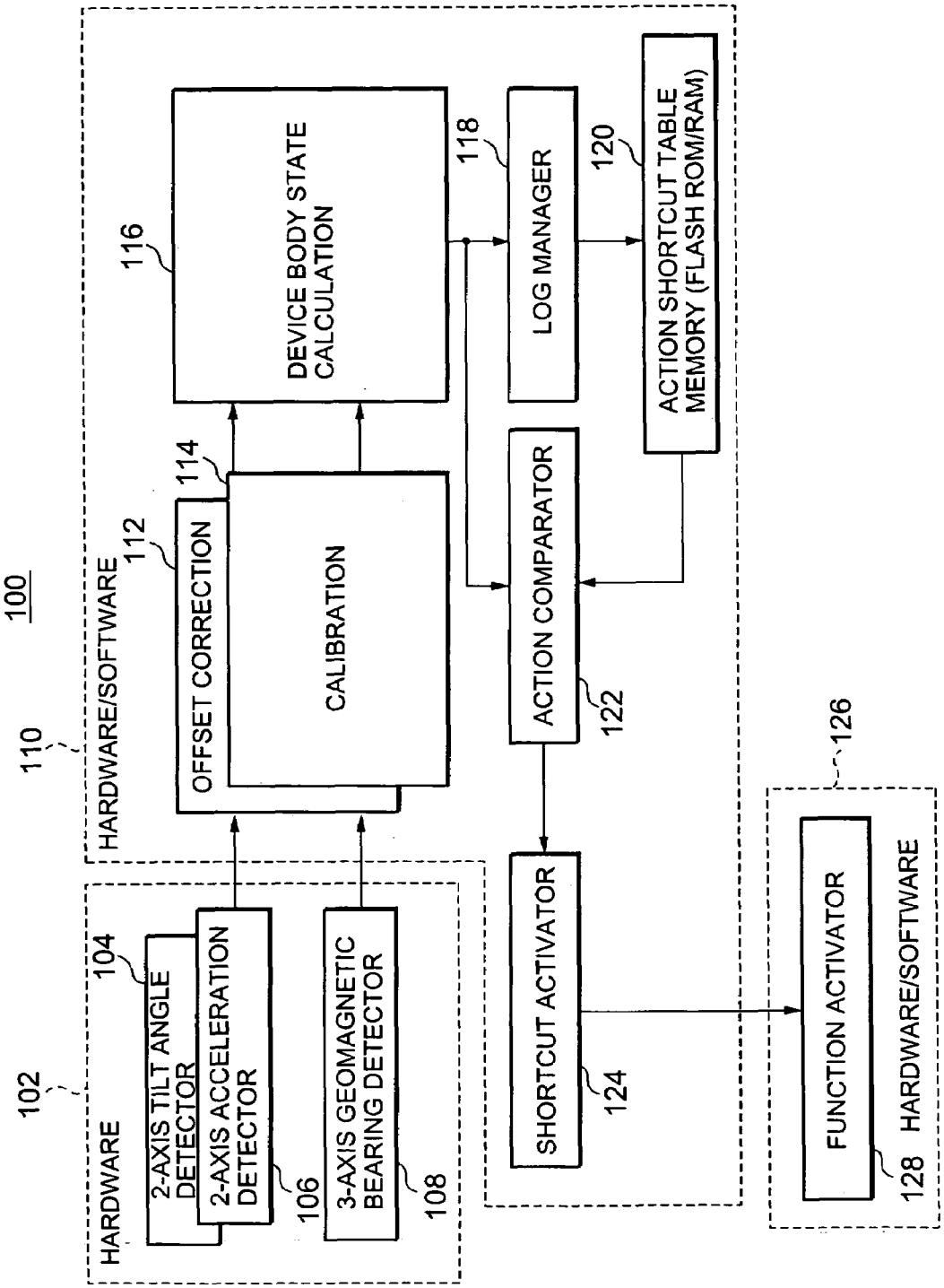

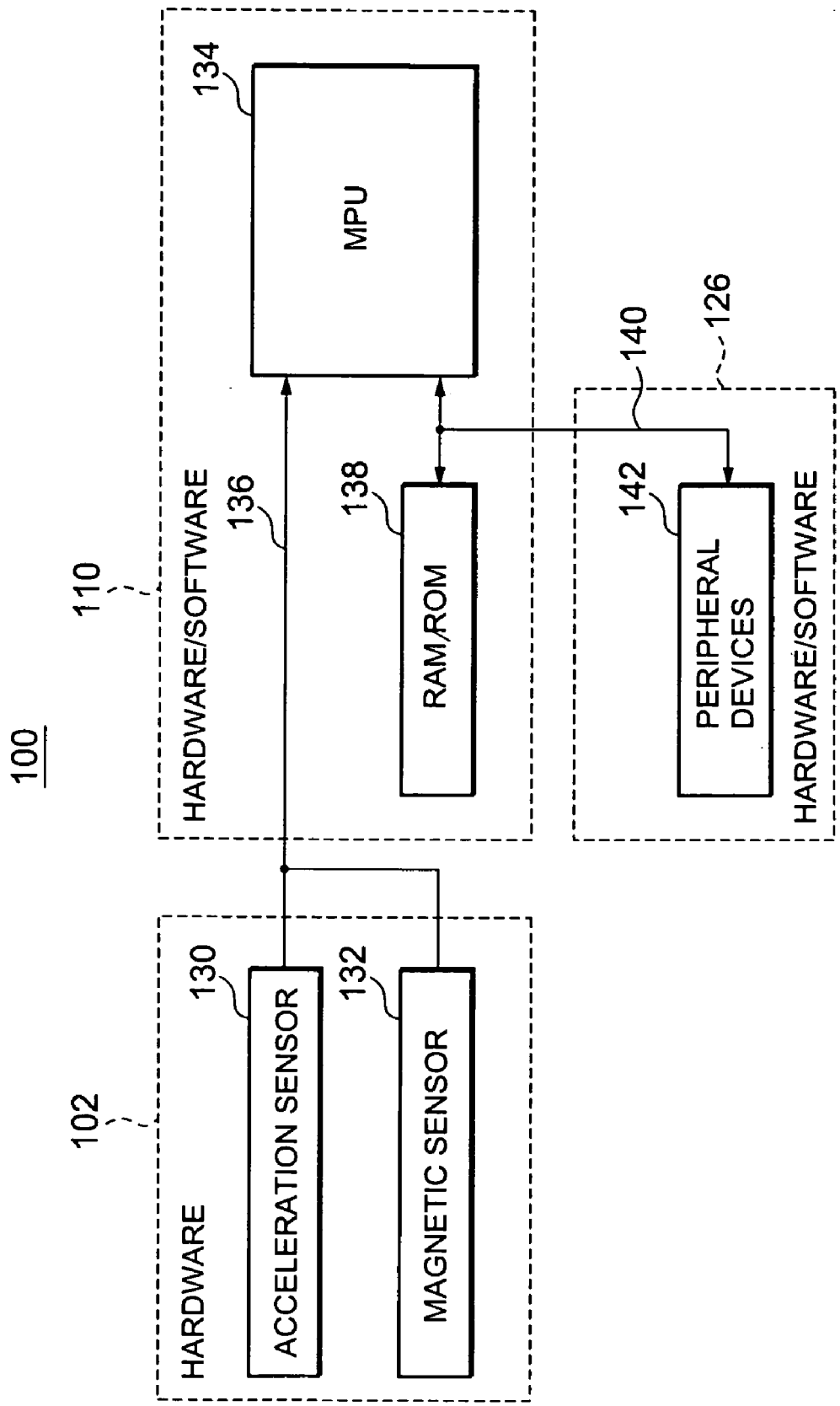

PORTABLE DEVICE WITH ACTION SHORTCUT FUNCTION

BACKGROUND OF THE INVENTION

1. Field of the Invention

The present invention relates to a portable information device such as a portable telephone terminal, portable information processing terminal or the like, and in particular to a portable information device having an action detecting function.

2. Description of the Related Art

To increase portability, portable information devices including portable telephone terminals are becoming smaller in size. However, for such miniaturization, display visibility and input operability are traded off. Recently, several techniques of increasing the input operability without degrading portability have been proposed.

Japanese Patent Application Unexamined Publication No. 2003-5879 discloses a portable information terminal having a rotating operation detector. The rotating operation detector detects a tilt of the terminal body rotating around one of predetermined axial directions (X, Y and Z axes) and, determines whether the terminal body tilts in the direction of a scroll arrow, typically one of upward, downward, rightward and leftward arrows, displayed on screen. When the tilt matches the scroll arrow, scrolling is started on the display.

Japanese Patent Application Unexamined Publication No. 2003-114752 discloses a portable information terminal device having a tilt detector and a controller controlling display of two rings of icons depending on a detected tilt direction. More specifically, the icons in the one ring are sequentially foremost displayed depending on the rightward/leftward direction of tilt and, after one icon has been selected from the one ring, the icons in the other ring are sequentially foremost displayed depending on the upward/downward direction of tilt.

Japanese Patent Application Unexamined Publication No. 2002-149616 discloses an information retrieval terminal having an acceleration sensor, which is used to detect a gesture of a user shaking or tilting the terminal body. The movement of displayed icons is controlled depending on a tilt angle of the upward, downward, rightward or leftward direction. When the terminal body is shaken, the retrieval is terminated.

However, the above-mentioned prior arts can detect only two dimensional movements such as rotation operations in the upward/downward direction or rightward/leftward direction of tilt. Further, the portable terminal itself cannot determine an absolute bearing with respect to the geomagnetic field. The information retrieval terminal (Publication No. 2002-149616) may determine its absolute bearing by placing the terminal body on the cradle.

Japanese Patent Application Unexamined Publication No. 2001-033253 discloses an attitude and angle detector using gyroscopes, geomagnetic field sensors and an acceleration sensor to detect an action of a device body. However, such a structure is not suitable for a portable device which is becoming smaller in size. In addition, gyroscopes are sensitive to physical shock. Therefore, when dropped, the attitude and angle detection is easily damaged because of breakage of gyroscopes.

SUMMARY OF THE INVENTION

An object of the present invention is to provide a portable device and an action shortcut method allowing precise 3-dimensional action recognition to perform a desired function.

Another object of the present invention is to provide a portable device allowing precise 3-dimensional action recognition based on an absolute bearing with respect to the geomagnetic field.

According to the present invention, a portable device having an action recognizing function, includes: an action detector for detecting a single 3-dimensional movement of the portable device; a memory for storing a plurality of reference action patterns each representing a plurality of predetermined single 3-dimensional movements of the portable device; and an action recognizer for recognizing an input single 3-dimensional movement of the portable device as one of the plurality of reference action patterns.

The portable device preferably has a plurality of predetermined functions, each of which is linked to a different one of the plurality of reference action patterns. The portable device further includes a shortcut activator for activating a predetermined function linked to a reference action pattern that substantially matches the input single 3-dimensional movement of the portable device.

The action recognizer may include: a reference action pattern manager for managing the plurality of reference action patterns stored in the memory such that the plurality of reference action patterns are registered, maintained or updated based on an input single 3-dimensional movement of the portable device; and an action comparator for comparing the input single 3-dimensional movement of the portable device with the plurality of reference action patterns to determine a reference action pattern that substantially matches the input single 3-dimensional movement of the portable device.

Each of the plurality of reference action patterns stored in the memory may include a plurality of sets of sampled data, each of which contains an angle acceleration vector, a roll angle, a pitch angle, and a bearing of the portable device. Each of the sets of sampled data may include error parameters representing individual characteristics of actions.

The action detector may include: a tilt detector for detecting a tilt of the portable device; an acceleration detector for detecting an acceleration working on the portable device; a magnetic compass detector for detecting a magnetic force working on the portable device; and a state calculator for calculating the single 3-dimensional movement of the portable device based on the tilt, the acceleration and the magnetic force. Further, the action detector may detect a single 3-dimensional movement of the portable device with or without an absolute compass bearing.

According to another aspect of the present invention, an action shortcut method in a portable device having a plurality of predetermined functions, includes the steps of: storing a plurality of reference action patterns in a memory, wherein the reference action patterns each represent a plurality of predetermined single 3-dimensional movements of the portable device; detecting a single 3-dimensional movement of the portable device; and recognizing an input single 3-dimensional movement of the portable device as one of the plurality of reference action patterns to determine which predetermined function is activated.

As described above, according to the present invention, by a user moving and rotating a portable device not only in one of pitch and roll directions but a combination of pitch and roll directions, such a single 3-dimensional movement of a portable device can be precisely detected. Further, such an action can be recognized by referring to reference action patterns that each represent predetermined single 3-dimensional actions. Such precise 3-dimensional action recognition can be also performed based on an absolute bearing with respect to the geomagnetic field. Since the time-varying movement of the portable device can be managed with respect to time axis, it is possible to link preset functions of the device to action shortcuts, respectively. Therefore, only action of the user moving the portable device activates a desired function.

BRIEF DESCRIPTION OF THE DRAWINGS

FIG. 1 is a block diagram showing the functional configuration of a portable information device according to an embodiment of the present invention;

FIG. 2 is a schematic block diagram showing an example of hardware structure of the portable information device according to the embodiment of the present invention;

DESCRIPTION OF THE PREFERRED EMBODIMENT

Figures 3A, 3B:
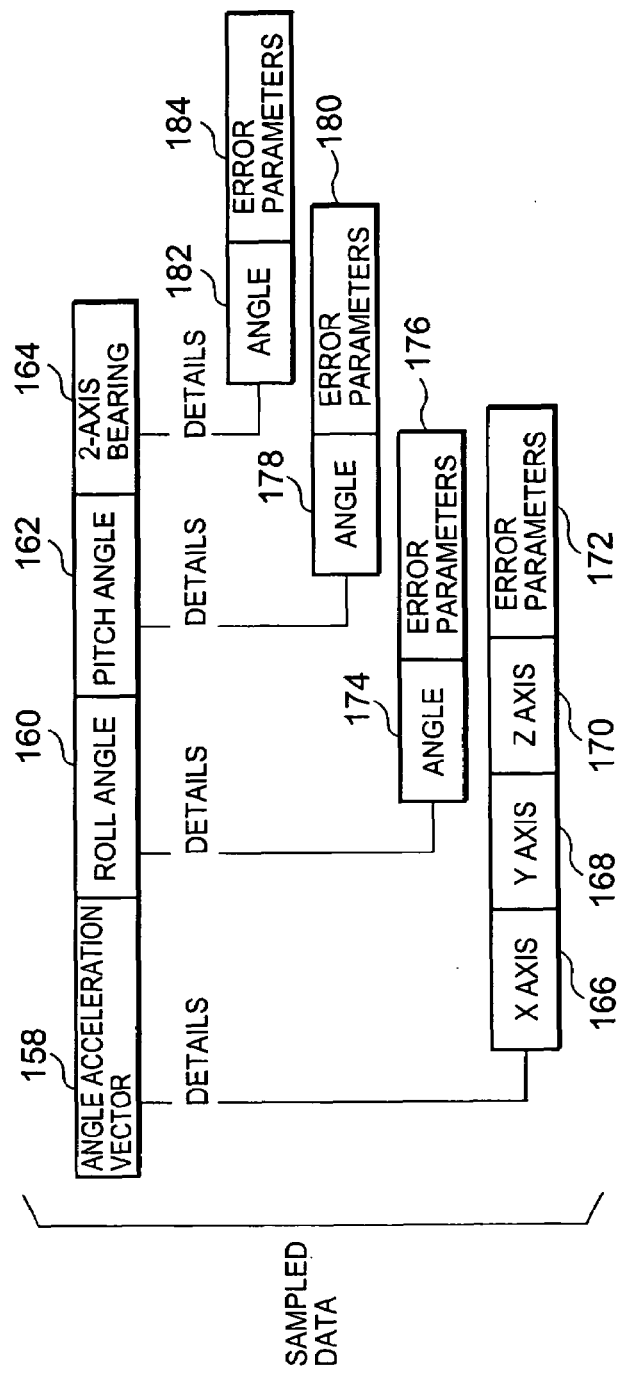
FIG. 3A is a diagram showing an example of an action shortcut table employed in the portable information device according to the first embodiment.
FIG. 3B is a diagram showing a format of sampled data in the action shortcut table as shown in FIG. 3A.

Referring to FIG. 1, a portable information device according to an embodiment of the present invention is provided with a 2-axis tilt angle detector 104, a 2-axis acceleration detector 106 and a 3-axis geomagnetic bearing detector 108, which may be collectively provided as one hardware section 102 of the portable information device 100.

The 2-axis tilt angle detector 104 is a tilt sensing means for sensing a roll angle about X axis and a pitch angle about Y axis with respect to a horizontal plane defined by the X axis and the Y axis. The 2-axis acceleration detector 106 is an acceleration sensing means for sensing varied accelerations of roll angle and pitch angle. The 3-axis geomagnetic bearing detector 108 is a magnetic compass sensing means for sensing the magnitude and direction of a total magnetic force acting on the portable information device 100.

The portable information device 100 is further provided with a hardware/software section 110, which includes an offset correction section 112, a calibration section 114, a device body state calculation section 116, a log manager 118, an action shortcut table 120, an action comparator 122, and a shortcut activator 124. In addition, the portable information device 100 is provided with a hardware/software section 126 including a function activator 128.

The offset correction section 112 and the calibration section 114 are provided in the same block so that an offset of ambient magnetic field is canceled and errors caused by ambient disturbance or variations in characteristics are compensated. The offset correction section 112 and the calibration section 114 output corrected measurements regarding tilt angle, acceleration and total magnetic force to the device body state calculation section 116.

The device body state calculation section 116 calculates the vertical direction (Z axis) with respect to the horizontal plane and further calculates a roll angle and pitch angle of the device body of the device 100 with reference to the vertical direction (Z axis) from the corrected measurements obtained by the offset correction section 112 and the calibration section 114. In other words, the device body state calculation section 116 detects an action state of the device 100 and produces device body state indicating data composed of angle acceleration data, roll angle and pitch angle data and, if necessary, bearing data. The device body state indicating data is outputted to the log manager 118 and the action comparator 122. The offset correction section 112, the calibration section 114 and the device body state calculation section 116 are combined to form an action detecting means.

The log manager 118 stores a log of device body state indicating data and learns individuality of user's actions to produce individual error parameters for the device body state indicating data. Accordingly, the individuality of user's action is converted into error parameters taking into account user's individual and fuzzy actions. The log manager 118 manages the action shortcut table 120 to save, update and delete action pattern data composed of the device body state indicating data and error parameters obtained by the learning function.

The action shortcut table 120 is an action database which stores registered shortcuts and corresponding action pattern data, which will be described in details later.

The log manager 118 and the action shortcut table 120 is an action pattern managing means for learning and managing the device body state indicating data as action patterns.

The action comparator 122 compares the current movement of the device body, that is, the action of a user moving the device 100, with the registered action patterns of the action shortcut table 120. When the current action matches one of the registered action patterns, the action comparator 122 instructs the shortcut activator 124 to activate an action shortcut corresponding to the matched action pattern and start running the corresponding function through the function activator 128.

In other words, the action comparator 122 is an action recognizing means. The action shortcut table 120, the action comparator 122 and the shortcut activator 124 are an action shortcut linking means for linking an action pattern to a predetermined function of the device 100 to be activated.

As shown in FIG. 2, the hardware section 102 is composed of an acceleration sensor 130 and a magnetic sensor 132. The acceleration sensor 130 is used to realize the 2-axis tilt angle detector 104 and the 2-axis acceleration detector 106. The magnetic sensor 132 is used to realize the 3-axis geomagnetic bearing detector 108.

The hardware/software section 110 is composed of a micro processing unit (MPU) 134 and a memory (RAM/Flash ROM) 138. The MPU 134 implements the above-described functions of the offset correction section 112, the calibration section 114, the device body state calculation section 116, the log manager 118, the action comparator 122, and the shortcut activator 124. The memory 138 is used as the action shortcut table 120, log management memory as well as work memories for the MPU 134.

The MPU 134 inputs the sensed acceleration data and magnetic field data from the acceleration sensor 130 and the magnetic sensor 132 through a data bus 136. Under the control of the MPU 134 as described above, the function of a peripheral device 142 is activated through a bus 140.

As described before, the MPU 134 executes necessary programs to perform offset correction and calibration of the magnetic field data that is sensed by the magnetic sensor 132 and calculate a precise geomagnetic bearing angle as a reference bearing from the corrected magnetic field data. Similarly, the MPU 134 executes necessary programs to perform offset correction and calibration of the acceleration data that is sensed by the acceleration sensor 130 and calculate a tilt angle data (roll angle and pitch angle) and acceleration (magnitude and direction) from the corrected acceleration data.

The device body state calculation program running on the MPU 134 converts the precise geomagnetic bearing angle, the tilt angle data and acceleration data into the device body state indicating data. The device body state indicating data is used to be evaluated by the log manager program, which registers the device body state indicating data and error parameters onto the action shortcut table of the memory 138. Accordingly, the registered action pattern data, which is updated if necessary, is used as reference data to determine whether input action data matches any registered action shortcut.

The action comparator program running on the MPU 134 compares the currently inputted device body state indicating data with the registered action patterns of the action shortcut table 120 taking into account individual fuzzy actions represented by error parameters. When a match is found within a permissible error, a corresponding one of predetermined functions of the device 100 is activated. Such predetermined functions maybe assigned to preset shortcut functions including a function of operating a hardware device.

Referring to FIG. 3A and FIG. 3B, the action shortcut table 120 contains three fields: Shortcut Name 150; Function Number 152; and Data 154.

The shortcut name field 150 stores the name representing a pre-installed function to be activated by a previously defined action. These shortcut names are displayed on a menu and a user's action is recognized as one of the shortcut names. The shortcut name can be freely registered by a user.

The function number field 152 is used to link user's action data to an actual software function and the processing indicated by a function number is to be activated.

The data field 154 stores action data registered by the user, which is a set of N pieces of sampled data 156 obtained by sampling the device body state indicating data generated by the user moving the device 100 at regular sampling rate. Here, an action data is defined as a set of N pieces of sampled data 1-N.

Further, each piece of sampled data 156 is composed of an angle acceleration vector 158, a roll angle 160, a pitch angle 162 and a 2-axis bearing 164 as shown in FIG. 3B. The 2-axis bearing 164 is provided if absolute bearing is needed for action recognition.

The angle acceleration vector 158 is represented by the direction and magnitude of the vector at a sampling instant. In other words, the angle acceleration vector 158 defines which direction the device 100 moves in and how much its acceleration is at that time instant.

As shown in FIG. 3B, the angle acceleration vector 158 is composed of X-axis component 166, Y-axis component 168, Z-axis component 170 and an angle acceleration error parameter at a sampling instant. The angle acceleration error parameter represents individual characteristics of the user in angle acceleration.

The roll angle 160 is composed of a roll angle 174 of the device 100 and a roll angle error parameter 176 representing individual characteristics of the user in roll angle at a sampling instant.

The pitch angle 162 is composed of a pitch angle 178 of the device 100 and a pitch angle error parameter 180 representing individual characteristics of the user in pitch angle at a sampling instant.

The 2-axis bearing 164 is added in sampled data 156 if the absolute bearing of the device 100 is needed to recognize its action. The 2-axis bearing 164 is composed of an absolute bearing angle 182 of the device 100 and a absolute bearing angle error parameter 184 representing individual characteristics of the user in absolute bearing angle at a sampling instant.

Operation

Figure 4B:
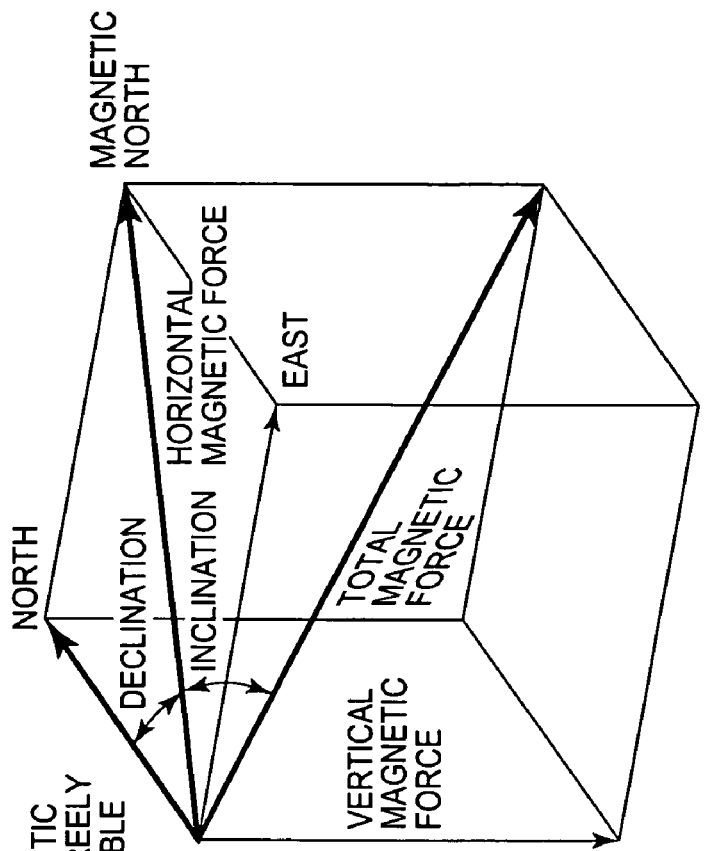
FIG. 4B is a diagram showing components of magnetic forces for explaining the offset correction.

An offset correction operation will be described with reference to FIGS. 4A and 4B. As described before, the offset correction section 112 cancels an inherent magnetic field of the portable information device 100 and an individual carrying it. In the case of the device 100 located in a vehicle, an individual carrying the portable information device 100 includes its user and the vehicle itself.

Figure 4A:
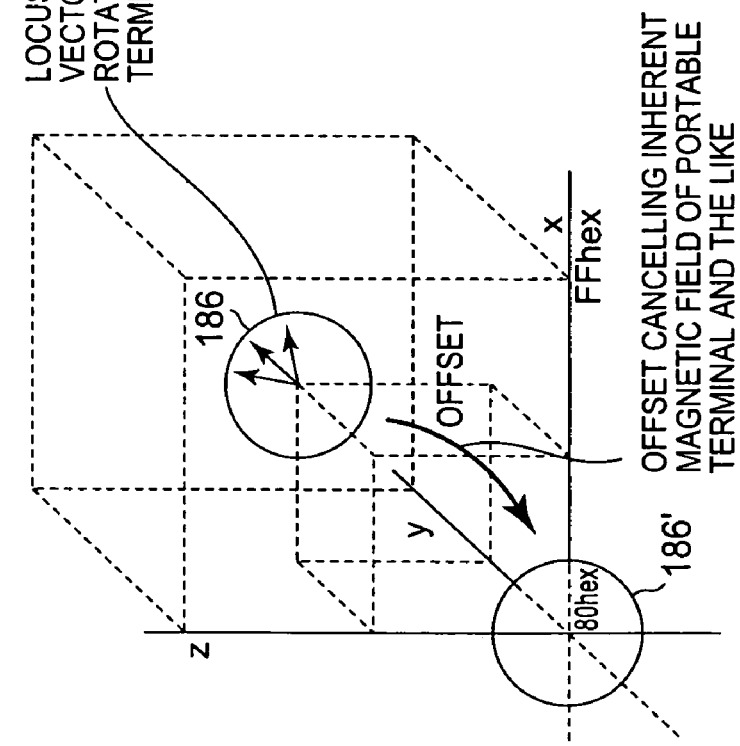
FIG. 4A is a diagram showing an offset canceling operation of an offset correction section in the portable information device of FIG. 1.

As shown in FIG. 4A, the locus 186 of a magnetic vector when the device 100 freely moving without canceling offset is deviated from the center (X, Y, Z)=(0, 0, 0) by a distance as a DC component caused by disturbance of the inherent magnetic field. Since calculation becomes difficult in such a deviation status, the locus 186 of a magnetic vector is shifted to the center as indicated by a reference numeral 186'. Such an offset processing is also needed to detect a deviation from the center due to a change in ambient magnetic field.

Similarly, offset correction and calibration of the acceleration data sensed by the acceleration sensor 130 are performed. Based on the corrected acceleration data, the device body state calculation section 116 calculates a tilt angle data (roll angle and pitch angle) and acceleration (magnitude and direction).

The device body state calculation section 116 running on the MPU 134 converts the precise geomagnetic bearing angle, the tilt angle data and acceleration data into the device body state indicating data. The device body state indicating data is used to be evaluated by the log manager 118, which registers the device body state indicating data and error parameters onto the action shortcut table 120. In this manner, the registered action pattern data, which will be updated, is used as reference data to determine whether input action data matches any registered action shortcut.

The action comparator 122 running on the MPU 134 compares the currently inputted device body state indicating data with the registered action patterns of the action shortcut table 120 taking into account individual fuzzy actions represented by error parameters. When a match within tolerance is found in the action shortcut table 120, a corresponding one of predetermined functions of the device 100 is activated. Such predetermined functions may be assigned to preset shortcut functions including a function of operating a hardware device.

Figure 5:
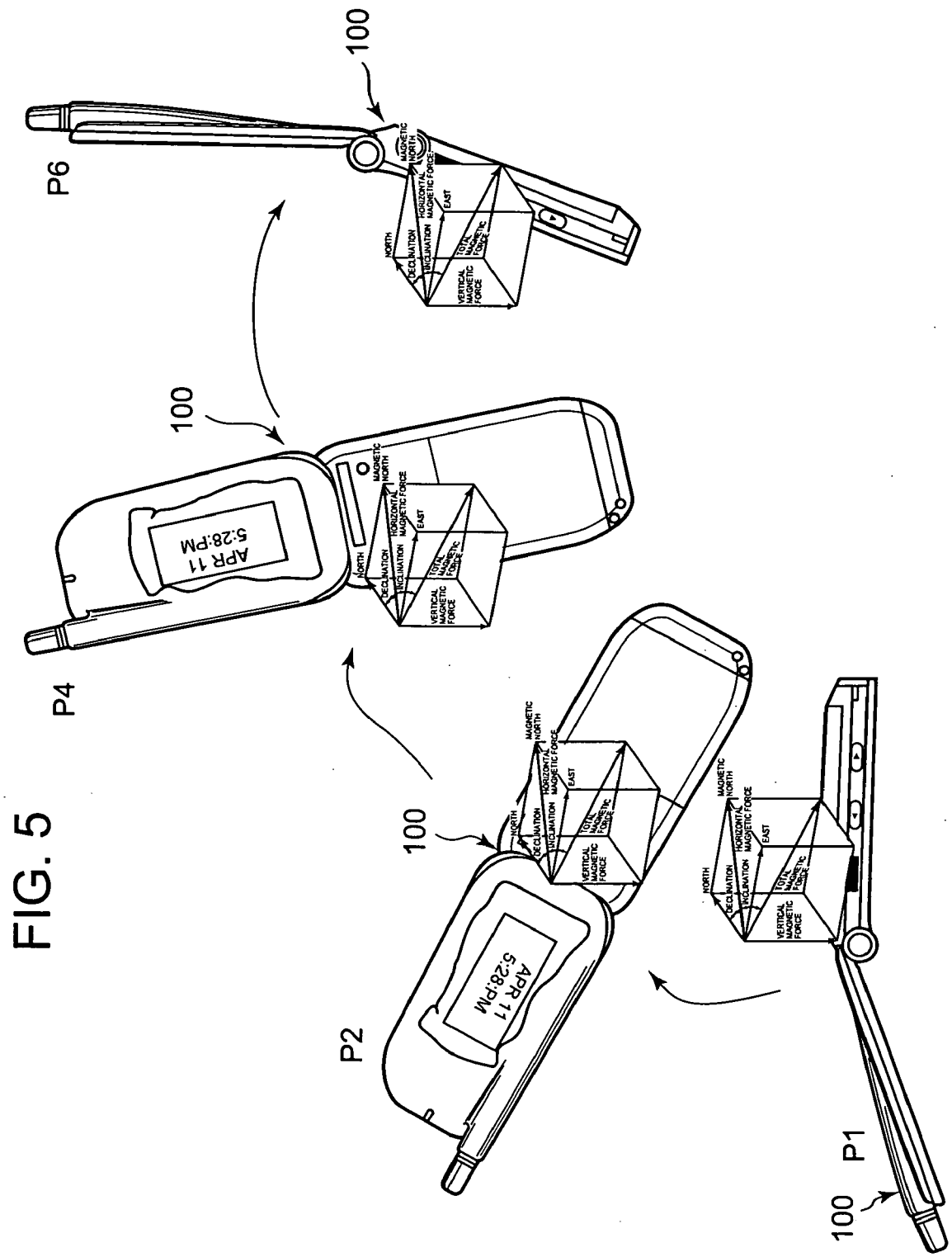
FIG. 5 is a diagram showing an example of movement of the portable information device according to the embodiment.

As shown in FIG. 5, the portable information device 100 may be moved and/or rotated actually. In this example, the attitude of the portable information device 100 is changed as indicated by reference symbols P1 to P6. Assuming that the ambient magnetic field has been offset, the respective direction and magnitude of a total magnetic force as shown in FIG. 4B are kept constant independently of the attitude of the portable information device 100. In other words, from the viewpoint of the portable information device 100, the direction of the total magnetic force is varied depending on the attitude of the portable information device 100.

Figure 6:
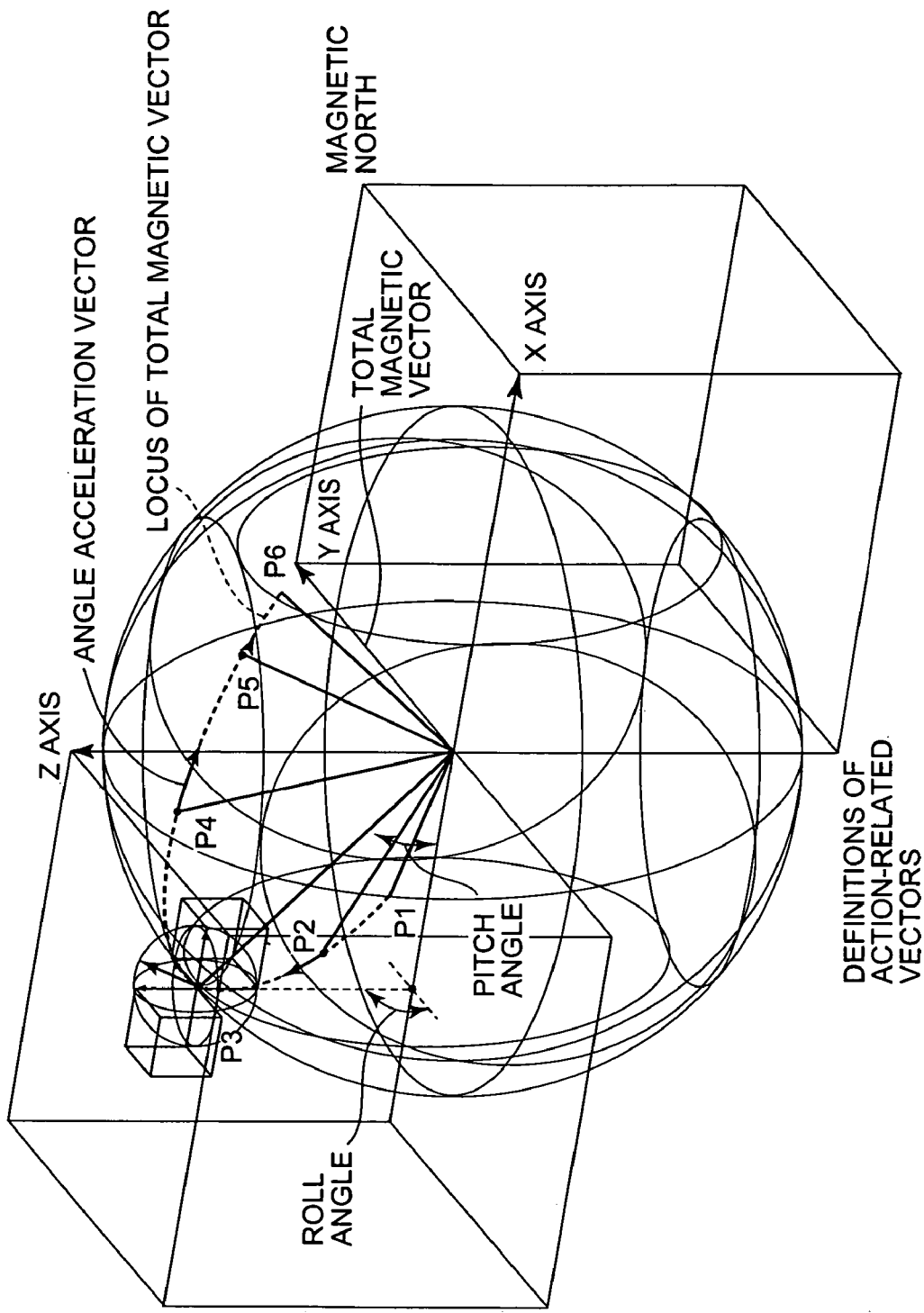
FIG. 6 is a diagram showing an example of locus of action-related vectors for registration or recognition.

Referring to FIG. 6, the movement of the portable information device 100 as shown in FIG. 5 is represented by the locus (shown by dashed lines) of a total magnetic vector from points P1 to P6 in an action-related vector space. Here, the points P1 to P6 in the action-related vector space indicates the sampling instants, respectively. A pitch angle is defined as a rotation angle of the total magnetic vector about Y axis from X axis. A roll angle is defined as a rotation angle of the total magnetic vector about X axis from Y axis. Accordingly a combination of the roll angle and the pitch angle can represent a three-dimensional space. In FIG. 6, the bearing of a total geomagnetic vector and the magnitude and direction of an angle acceleration vector from P1 to P6 at each sampling instant are linked with the combination of roll angle and pitch angle.

As described before, the angle acceleration vector, the roll angle and the pitch angle are obtained from tilt data sensed by the acceleration sensor. If the absolute bearing is needed for action pattern recognition, then a 2-axis bearing obtained from the corrected geomagnetic bearing angle is attached to the roll angle and the pitch angle at each sampling instant.

The locus of the total magnetic vector from P1 to P6 at sampling time instants is registered as a reference action pattern in the action shortcut table 120. For example, when a user is making a call by lifting the portable information device 100, the off-hook action is sampled at regular intervals and registered as the locus of the total magnetic vector linked to the off-hook function (Function No. 1002 in FIG. 3A) into the action shortcut table 120 through the log manager 118. After such an action pattern has been registered as a reference action pattern, when the user picks up the portable information device 100 and makes substantially the same off-hook action, this action is sampled and this input action pattern, that is, the locus of the total magnetic vector generated by this action, is compared with the registered reference action patterns by the action comparator 122. When the input action pattern approximately matches the registered reference action pattern indicating off-hook (Function No. 1002 in FIG. 3A), the shortcut activator 124 instructs a mobile telephone system of the device 100 to active the off-hook function.

In this example, a 2-axis bearing obtained from the corrected geomagnetic bearing angle is attached to each point at a sampling instant. Such an absolute bearing may be used by an application. For example, a simple action game application can be used without such bearing data. The present embodiment can apply to applications requiring absolute bearing data, such as bearing-related games, treasure search games, oriental bearing-related written oracles, sophisticated action games and the like.

As described above, a time-varying attitude and direction status of the portable information device 100 can be managed with respect to time axis. Accordingly, it is possible to link preset functions of the device 100 to action shortcuts, respectively. For example, when the user imitates an off-hook action, the linked off-hook function is activated. When the user imitates an on-hook action, the linked on-hook function (Function No. 1004 in FIG. 3A) is activated. When the user imitates an action of operating a magnetic compass, an electronic compass function is activated. In this manner, user's gestures can activate corresponding functions easily. The present invention can provide means of successfully using the portable information device 100 without the need of complicated operations, resulting in dramatically increased operability. Accordingly, the present invention can be applied to means for providing the aged with various functions and input means for action games for youth.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

For example, the present invention can be applied to not only portable telephone terminals but also portable input devices for game machines. Specifically, a marble maze game may be realized on a display, which puts GUI techniques to full use to provide real rolling movement of a marble on a plane which can be tilted to various directions. Tilting the portable information device 100 causes a marble to move downward as if to roll down a slope depending on the acceleration of tilting and its inclination angle. In the case of the present invention applied to a role-playing game, the following effect may be achieved: an abrupt change in acceleration like jumping causes a hero/heroin of the game to jump.

In addition, as described before, the action characteristics of users may be different from each other and therefore the registered reference action patterns can also support user identification.

The invention claimed is:

1. A portable device having an action recognizing function, comprising:
   an action detector for detecting a single 3-dimensional movement of the portable device;
   a memory for storing a plurality of reference action patterns each representing a plurality of predetermined single 3-dimensional movements of the portable device; and
   an action recognizer for recognizing an input single 3-dimensional movement of the portable device as one of the plurality of reference action patterns,
   a reference action pattern manager for managing the plurality of reference action patterns stored in the memory such that the plurality of reference action patterns are registered, maintained or updated based on an input single 3-dimensional movement of the portable device; and
   an action comparator for comparing the input single 3-dimensional movement of the portable device with the plurality of reference action patterns to determine a reference action pattern that substantially matches the input single 3-dimensional movement of the portable device,
   wherein each of the plurality of reference action patterns stored in the memory comprises a plurality of sets of sampled data, each of which contains an angle acceleration vector, a roll angle, a pitch angle, and a bearing of the portable device.

2. The portable device according to claim 1, wherein each of the sets of sampled data includes error parameters representing individual characteristics of actions.

3. A portable device having an action recognizing function, comprising:
   an action detector for detecting a single 3-dimensional movement of the portable device;
   a memory for storing a plurality of reference action patterns each representing a plurality of predetermined single 3-dimensional movements of the portable device; and an action recognizer for recognizing an input single 3-dimensional movement of the portable device as one of the plurality of reference action patterns, wherein the action detector comprises:

a tilt detector for detecting a tilt of the portable device;

an acceleration detector for detecting an acceleration working on the portable device;

a magnetic compass detector for detecting a magnetic force working on the portable device; and a state calculator for calculating the single 3-dimensional movement of the portable device based on the tilt, the acceleration and the magnetic force.

4. The portable device according to claim 3, wherein the state calculator calculates a reference direction from the tilt, the acceleration and the magnetic force to determine the single 3-dimensional movement of the portable device at predetermined sampling intervals.

5. The portable device according to claim 4, wherein each sampled data contains an angle acceleration vector, a roll angle, a pitch angle, and a magnetic bearing of the portable device.

6. The portable device according to claim 5, wherein each of the angle acceleration vector, the roll angle, the pitch angle and the magnetic bearing is attached with an error parameter representing individual characteristics of action.

7. An action shortcut method in a portable device having a plurality of predetermined functions, comprising:

storing a plurality of reference action patterns in a memory, wherein the reference action patterns each represent a plurality of predetermined single 3-dimensional movements of the portable device;

detecting a single 3-dimensional movement of the portable device;

recognizing an input single 3-dimensional movement of the portable device as one of the plurality of reference action patterns to determine which predetermined function is activated; and performing, by the portable device, the predetermined function linked to the reference action pattern than substantially matches the input single 3-dimensional movement of the portable device, wherein the portable device is a game machine, and wherein the predetermined function corresponds to a simulated movement on a display of a component used in a game being executed by the game machine, wherein the recognizing step comprises:

managing the plurality of reference action patterns stored in the memory such that the plurality of reference action patterns are registered, maintained or updated based on an input single 3-dimensional movement of the portable device; and comparing the input single 3-dimensional movement of the portable device with the plurality of reference action patterns to determine a reference action pattern that substantially matches the input single 3-dimensional movement of the portable device, wherein each of the plurality of reference action patterns stored in the memory comprises a plurality of sets of sampled data, each of which contains an angle acceleration vector, a roll angle, a pitch angle, and a bearing of the portable device.

8. The action shortcut method according to claim 7, wherein each of the sets of sampled data includes error parameters representing individual characteristics of actions.

9. An action shortcut method in a portable device having a plurality of predetermined functions, comprising:

storing a plurality of reference action patterns in a memory, wherein the reference action patterns each represent a plurality of predetermined single 3-dimensional movements of the portable device;

detecting a single 3-dimensional movement of the portable device;

recognizing an input single 3-dimensional movement of the portable device as one of the plurality of reference action patterns to determine which predetermined function is activated; and performing, by the portable device, the predetermined function linked to the reference action pattern than substantially matches the input single 3-dimensional movement of the portable device, wherein the portable device is a portable telephone, and wherein the predetermined function corresponds to an on-hook or off-hook call function of the portable telephone, wherein the recognizing step comprises:

managing the plurality of reference action patterns stored in the memory such that the plurality of reference action patterns are registered, maintained or updated based on an input single 3-dimensional movement of the portable device; and comparing the input single 3-dimensional movement of the portable device with the plurality of reference action patterns to determine a reference action pattern that substantially matches the input single 3-dimensional movement of the portable device, wherein each of the plurality of reference action patterns stored in the memory comprises a plurality of sets of sampled data, each of which contains an angle acceleration vector, a roll angle, a pitch angle, and a bearing of the portable device.

* * * * *